(12) United States Patent
McCain

(10) Patent No.: US 11,042,914 B1
(45) Date of Patent: Jun. 22, 2021

(54) DIMENSIONLESS WINDOW AND DOOR INSTALLATION ESTIMATION

(71) Applicant: Shawn L. McCain, Leander, TX (US)

(72) Inventor: Shawn L. McCain, Leander, TX (US)

( * ) Notice: Subject to any disclaimer, the term of this patent is extended or adjusted under 35 U.S.C. 154(b) by 0 days.

(21) Appl. No.: 17/172,483

(22) Filed: Feb. 10, 2021

Related U.S. Application Data

(60) Provisional application No. 62/972,892, filed on Feb. 11, 2020.

(51) Int. Cl.
*G06F 3/048* (2013.01)
*G06Q 30/02* (2012.01)
*G06F 3/0482* (2013.01)
*G06Q 30/06* (2012.01)

(52) U.S. Cl.
CPC ....... *G06Q 30/0283* (2013.01); *G06F 3/0482* (2013.01); *G06Q 30/0643* (2013.01)

(58) Field of Classification Search
CPC ...... G06F 3/048; G06F 3/0481; G06F 3/0482; G06F 3/0484; G06Q 30/02; G06Q 30/06
See application file for complete search history.

(56) References Cited

U.S. PATENT DOCUMENTS

| | | | |
|---|---|---|---|
| 2003/0115163 A1* | 6/2003 | Moore | G06Q 30/0283 705/500 |
| 2010/0070905 A1* | 3/2010 | Mizumori | G06Q 10/04 715/772 |
| 2013/0018850 A1* | 1/2013 | Houlihan | G06Q 30/0611 707/690 |
| 2014/0214473 A1* | 7/2014 | Gentile | G06Q 10/06313 705/7.23 |
| 2014/0324404 A1* | 10/2014 | de la Torre-Bueno | G06F 30/20 703/6 |
| 2015/0242095 A1* | 8/2015 | Sonnenberg | A47F 11/06 715/810 |
| 2015/0286938 A1* | 10/2015 | Blair | G06F 30/20 706/11 |
| 2020/0242676 A1* | 7/2020 | Hall | G06Q 30/0641 |

* cited by examiner

*Primary Examiner* — Xiomara L Bautista
(74) *Attorney, Agent, or Firm* — Ulmer & Berne LLP

(57) ABSTRACT

Estimator computing systems and methods are provided to generate estimates for window and door replacement without requiring measurement of the windows or doors. A user, such as a homeowner, can interact with an estimator computing system via a website or mobile application. After entering into the graphical user interface of the estimator computing system the total number of windows to be replaced, the user is presented with an installation estimate.

20 Claims, 15 Drawing Sheets

DIMENSIONLESS WINDOW AND DOOR INSTALLATION ESTIMATION

This application claims the benefit of U.S. Ser. No. 62/972,892, entitled DIMENSIONLESS WINDOW AND DOOR INSTALLATION ESTIMATION and filed Feb. 11, 2020, the disclosure of which is incorporated herein by reference in its entirety.

BACKGROUND

Homeowners desiring to replace their windows and doors have limited options with regard to obtaining installation quotes from installers. In many cases, to begin the process, the homeowner must request a sales representative to visit their home in order to count and measure their windows and doors. This process can be considered inconvenient for many homeowners. This process can also be time consuming and inefficient for sales representatives, as homeowners may not be serious about replacing their windows and doors, but the sales representative must still visit the home in order to prepare an estimate for the homeowner to consider. Additionally, it is challenging for sales representatives to identify which homeowners may be interested in new windows and doors, often relying on undesirable door-to-door sales tactics.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
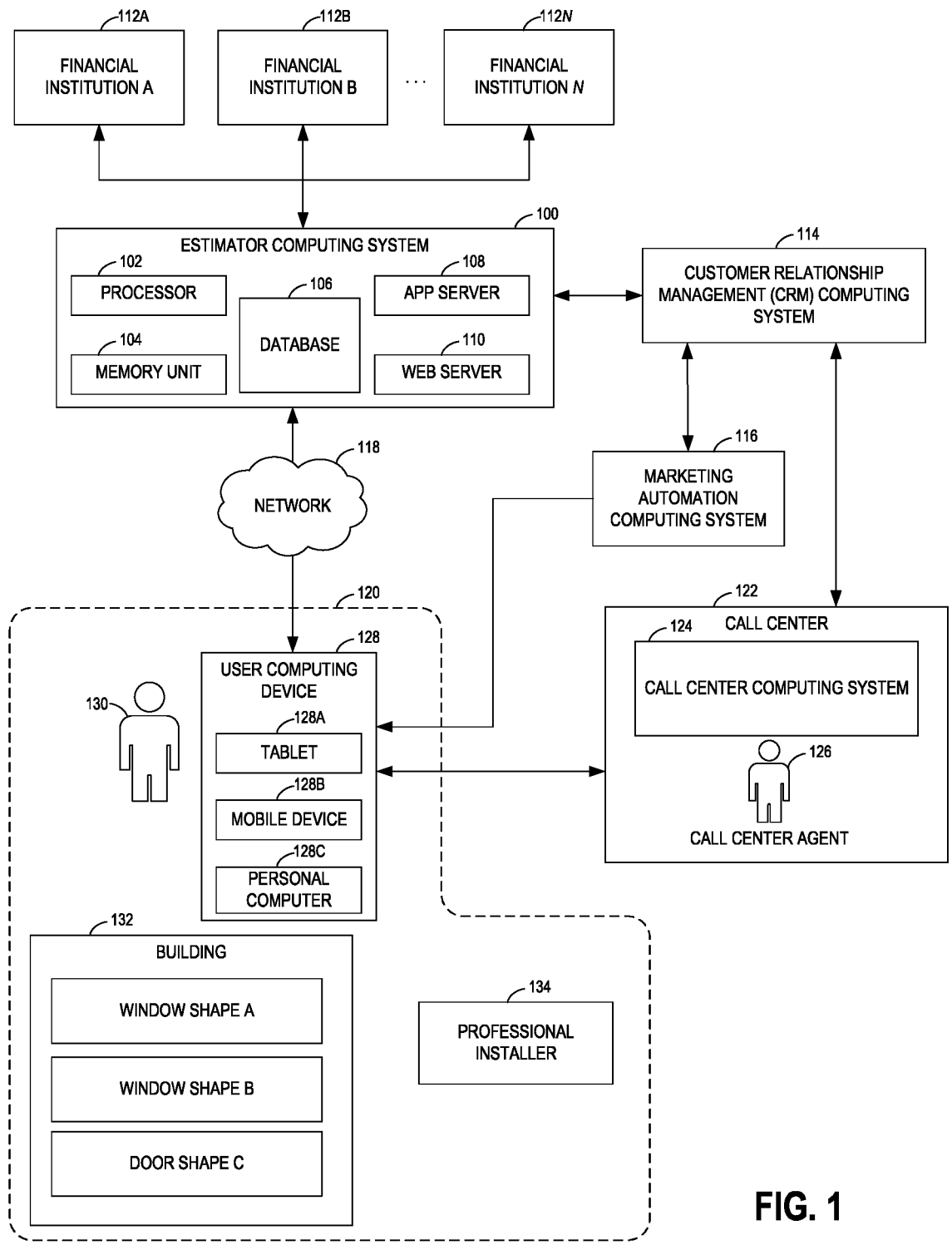
FIG. 1 depicts an estimator computing system for providing an estimate to a user for the replacement of windows and/or doors of a building without the need for the user to provide physical measurements.

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described in detail with reference made to FIGS. 1-14 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identification of specific details or examples is not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented, but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context. It should be noted that, although for clarity and to aid in understanding, some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, than are described.

As described in more detail below, the present disclosure generally relates to the automated generation of estimates for the replacement of window and doors without requiring the windows or doors to be measured by the homeowner. The homeowner is not required to interface with a human sales representative, as all of the required information can be simply and easily provided by the homeowner via an interface on a website or mobile application. The present disclosure further relates to approaches for the automated management of customer relationships to increase the likelihood of a sale conversion. Referring now to FIG. 1, one example embodiment of the present disclosure can comprise an estimator computing system 100. The estimator computing system 100 can be provided using any suitable processor-based device or system, such as a personal computer, laptop, server, mainframe, or a collection (e.g., network) of multiple computers, for example. The estimator computing system 100 can include one or more processors 102 and one or more computer memory units 104. For convenience, only one processor 102 and only one memory unit 104 are shown in FIG. 1. The processor 102 can execute software instructions stored on the memory unit 104. The processor 102 can be implemented as an integrated circuit (IC) having one or multiple cores. The memory unit 104 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 104 can store executable software and data for the estimator computing system 100. When the processor 102 of the estimator computing system 100 executes the software, the processor 102 can be caused to perform the various operations of the estimator computing system 100. Data used by the estimator computing system 100 can be from various sources, such as a database(s) 106, which can be an electronic computer database, for example. The data stored in the database(s) 106 can be stored in a non-volatile computer memory, such as a hard disk drive, a read only memory (e.g., a ROM IC), or other types of non-volatile memory. In some embodiments, one or more databases 106 can be stored on a remote electronic computer system, for example. As it to be appreciated, a variety of other databases, or other types of memory storage structures, can be utilized or otherwise associated with the estimator computing system 100.

The estimator computing system 100 can be in communication with various computing devices, such as a customer relationship management (CRM) computing system 114. While the estimator computing system 100 and the CRM computing system 114 are shown as separate computing systems in FIG. 1 for the purposes of illustration, it is to be appreciated that in some embodiments the functionality of the estimator computing system 100 and the functionality of the CRM computing system 114 can be performed by a single computing system, a combination of a computing systems, including closed-based system, and so forth. The CRM computing system 114 can further include, or at least be in communication with, a marketing automation computing system 116. The estimator computing system 100 can also be in communication with a plurality of financial institutions 112A-N for the purposes of retrieving finance offers. It is to be appreciated that various intermediate entities may be positioned between the estimator computing system 100 and the financial institutions 112A-N to help facilitate the finance offers.

The estimator computing system 100 can also be in communication with a plurality of users 130 via their user computing device 128 through a communication network 118. While only a single user 130 is illustrated in FIG. 1 for the sake of illustration, it is to be appreciated that the estimator computing system 100 can be in communication with any number of users 130.

The estimator computing system 100 can communicate with the various computing systems and devices via a number of computer and/or data networks, including the Internet, LANs, WANs, GPRS networks, etc., that can comprise wired and/or wireless communication links.

The user computing device 128 can be any type of computer device suitable for communication with the estimator computing system 100 over the network 118, such as a wearable computing device, a mobile telephone, a tablet computer, a device that is a combination handheld computer and mobile telephone (sometimes referred to as a "smart phone"), a personal computer (such as a laptop computer, netbook computer, desktop computer, and so forth), or any other suitable mobile communications device, such as personal digital assistants (PDA), gaming devices, or media players, for example. Examples of wearable computing device (sometimes referred to as a "wearable") include devices that incorporate an augmented reality or virtual reality head-mounted display as well as other computing devices that can be worn by the user 130. For illustration purposes, the user computing devices 128 is schematically shown to include any of a tablet 128A, a mobile device 128B, and a personal computer 128C.

The user computing device 128 can, in some embodiments, provide a variety of applications for allowing the user 130 to accomplish one or more specific tasks using the estimator computing system 100. Applications can include, without limitation, a web browser application (e.g., INTERNET EXPLORER, MOZILLA, FIREFOX, SAFARI, OPERA, NETSCAPE NAVIGATOR) telephone application (e.g., cellular, VoIP, PTT), networking application, messaging application (e.g., e-mail, IM, SMS, MMS, BLACKBERRY Messenger), social media applications, and so forth. The user computing device 128 can comprise various software programs such as system programs and applications to provide computing capabilities in accordance with the described embodiments. System programs can include, without limitation, an operating system (OS), device drivers, programming tools, utility programs, software libraries, application programming interfaces (APIs), and so forth. Exemplary operating systems can include, for example, a PALM OS, MICROSOFT OS, APPLE OS, ANDROID OS, UNIX OS, LINUX OS, SYMBIAN OS, EMBEDIX OS, Binary Run-time Environment for Wireless (BREW) OS, JavaOS, a Wireless Application Protocol (WAP) OS, and others.

The user computing device 128 can include various components for interacting with the estimator computing system 100. The user computing device 128 can include components for use with one or more applications such as a stylus, a touch-sensitive screen, keys (e.g., input keys, preset and programmable hot keys), buttons (e.g., action buttons, a multidirectional navigation button, preset and programmable shortcut buttons), switches, a microphone, speakers, an audio headset, and so forth.

The user 130 can interact with the estimator computing system 100 via a variety of other electronic communications techniques, such as, without limitation, HTTP requests, in-app messaging, and short message service (SMS) messages. The electronic communications can be generated by a specialized application executed on the user computing device 128 or can be generated using one or more applications that are generally standard to the user computing device 128. The applications can include or be implemented as executable computer program instructions stored on computer-readable storage media such as volatile or non-volatile memory capable of being retrieved and executed by a processor to provide operations for the user computing device 128.

As shown in FIG. 1, the estimator computing system 100 can include several computer servers and databases. For example, the estimator computing system 100 can include one or more web servers 110, application servers 108, and/or any other type of servers. For convenience, only one web server 110 and one application server 108 are shown in FIG. 1, although it should be recognized that the disclosure is not so limited. The servers can cause content to be sent to the user computing device 128 in any number of formats, such as text-based messages, multimedia message, email messages, smart phone notifications, web pages, and so forth. The servers 108 and 110 can comprise processors (e.g., CPUs), memory units (e.g., RAM, ROM), non-volatile storage systems (e.g., hard disk drive systems), etc. The servers 108 and 110 can utilize operating systems, such as Solaris, Linux, or Windows Server operating systems, for example.

The web server 110 can provide a graphical web user interface through which various users of the system can interact with the estimator computing system 100. The web server 110 can accept requests, such as HTTP requests, from clients (such as via web browsers on the user computing device 128), and serve the clients responses, such as HTTP responses, along with optional data content, such as web pages (e.g., HTML documents) and linked objects (such as images, video, and so forth).

The application server 108 can provide a user interface for users who do not communicate with the estimator computing system 100 using a web browser. Such users can have special software installed on their user computing device 128 that allows them to communicate with the application server 108 via the network. Such software can be downloaded, for example, from the estimator computing system 100, or other software application provider, over the network to such user computing device 128.

As shown, the user 130 can be associated with a building 132 having windows and doors. The user 130 can be, without limitation, a homeowner, a tenant, a landlord, a property manager, or a facilities manager. Further, the building 132 can be a single or multi-family home, although this disclosure is not so limited. The building 132 can have a variety of different windows having different sizes and shapes, as well as a variety of doors having different sizes and shapes. For illustration purposes, the building 132 is shown to have windows of shape A and shape B and a door of shape C. The building 132 can be located in a geographic area 120 that is serviced by a professional installer 134.

Through interactions with their user computing device 128, the user 130 can interact with the estimator computing system 100 to receive an estimate for replacing the windows, the doors, or both the windows and doors of the building 132. The user 130 is not required to physically measure any of the windows or doors in the building 132. Instead, via an interface, the user 130 simply inputs the total number of windows to be replaced and the total number of doors to be replaced. Various other non-dimensional attributes can be provided to the estimator computing system 100 to aid in the estimation process, such as the window/door color, building type, and so forth. Subsequent to receiving the total number of windows and/or doors to be replaced from the user 130, the estimator computing system 100 can generate an estimate for the replacement of the windows/doors.

As actual dimensions of the windows and doors of the building 132 are not entered by the user 130, the estimate generated by the estimator computing system 100 can be based on, for example, average united inches (U.I.) of a typical window in a residential structure. As described in more detail below, the estimator computing system 100 can utilize one average united inches value for rectangular windows and another average united inches value for non-rectangular windows. The estimator computing system 100 can estimate the total united inches value for the building 132 based on stored average united inches values and the quantity of windows entered by the user 130. Then, using a cost-per-inch value stored by the estimator computing system 100, the estimator computing system 100 can prepare the estimate. The cost-per-inch value may vary based on, for example, window quality, building type, grid/no grid options, single pane/double pane options, and so forth. A similar approach can be utilized for generating the estimate with regard to replacing doors of the building 132. In any event, while a user 130 may be able to select various attributes or options, they will not be required to take any actual measurements of any window or door.

The estimate is provided to the user 130 via the interface on the user computing device 128 by the estimator computing system 100. In some embodiments, to encourage action by the user 130, the estimator computing system 100 can graphically indicate the estimate is only valid for a certain window of time (such as 30 days, 7 days, 24 hours, etc.). The estimator computing system 100 can also offer financing options to the user 130. Users wishing to pursue financing can receive loan information from the financial institutions 112A-N. The user 130 can also be given the option to schedule a follow-up phone call to discuss the estimate and the installation process.

The estimator computing system 100 can also leverage the CRM computing system 114 to manage the information received from the user 130 via their interactions with the website or mobile application. For instance, the CRM computing system 114 can create a user record that includes the user name, address, email address, phone number, and so forth, as well as information received regarding the building 132 and the estimate that was generated.

In some instances, the user 130 may not actively accept or otherwise engage with the estimator computing system 100 after the estimate is presented. In order to attempt to capture business from that user 130, a marketing automation computing system 116 can be used to reach out to the user 130 over time using various communication, such as text messages, email messages, postal mailings, telephone calls, and so forth. Additional details regarding example interactions with users of the system is provided below with reference to FIG. 14.

Additionally, in accordance with various embodiments, a call center 122 having one or more call center agents 126 can be used to receive inbound calls from the user 130 and/or place sales calls to the user 130. A call center computing system 124 can be populated with lead information from the CRM computing system 114 to aid the call center agent 126.

Once the user 130 has indicated they wish to move forward with the process, the professional installer 134 can visit the building 132, meet with the user 130, and collect additional information that may be needed to complete the work. It is noted that in some embodiments, the user 130 can be presented with profiles for a plurality of different professional installers 134 in their geographic area 120 and select which of the professional installers 134 they wish to use.

Figure 2:
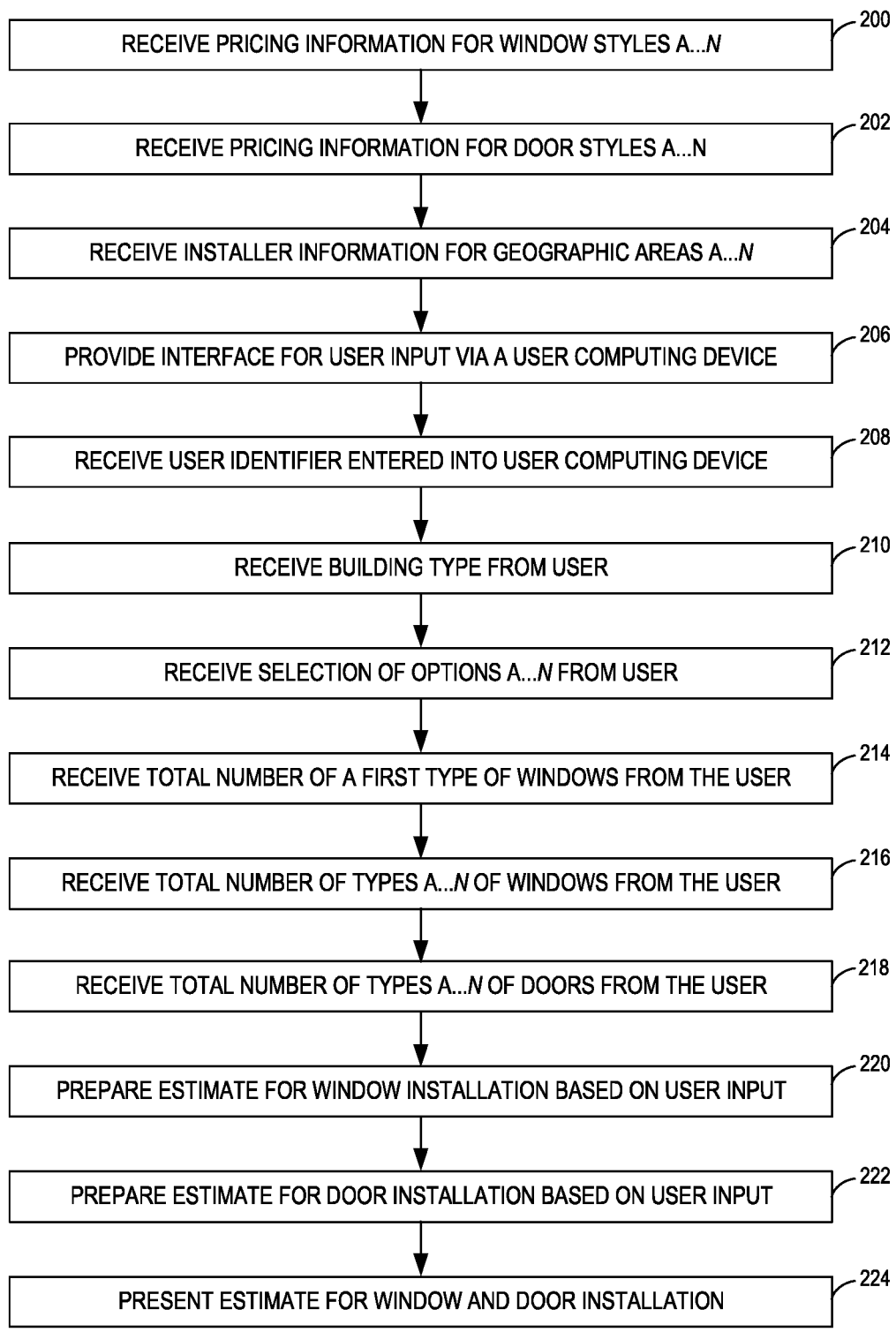
FIG. 2 is an example flow chart of a process that can be performed by an estimator computing system in accordance with one non-limiting embodiment.

FIG. 2 is an example flow chart of a process that can be performed by an estimator computing system 100 in accordance with one non-limiting embodiment. At 200, the estimator computing system 100 can receive pricing information for each of a plurality of different window styles. The pricing information can be based on, for example, a cost-per-inch or other suitable pricing convention for different window styles, window colors, and so forth. At 202, the estimator computing system 100 can receive pricing information for each of a plurality of different door styles, such as two-panel doors, three-panel doors, and so forth. At 204, the estimator computing system 100 can receive installer information for a plurality of different geographic areas. The estimator computing system 100 can subsequently use that information to route leads to an installer that services the geographic area of a particular user.

At 206, the estimator computing system 100 can provide an interface to a user computing device via network communications. The interface can be presented, for example, via a webpage, a mobile application, or any other suitable interface or display. At 208, the estimator computing system 100 can receive a user identifier entered into the interface by the user. The user identifier can be any suitable identifier, such as an email address, a home address, first/last name, and so forth. Such user identifier can be used to build a user record for that user in a CRM computing system.

At 210, the estimator computing system 100 can receive a building type from the user. The building type can be used to more accurately generate the estimate. The building type can identify, for example, whether the building is brick, has vinyl siding, is stucco, among other types of buildings. At 212, the estimator computing system 100 can receive a variety of other options, as selected by the user. Such options can include, without limitation, color, style, and so forth.

At 214, the estimator computing system 100 can receive a total number of windows of a first type, as counted and entered by the user. Such first type may be, for example, rectangular or square windows. Notably, the user does not enter window measurements, only quantity. At 216, the estimator computing system 100 can receive a total number of windows of other types, as counted and entered by the user. Such other types may be, for example, non-rectangular or non-square windows. Again, the user does not enter window measurements, only quantity. At 218, the estimator computing system 100 can receive a total number of doors (if the user is interested in door replacement), as counted and entered by the user. Again, the user does not enter measurements of the doors, only quantity.

At 220, the estimator computing system 100 can prepare an estimate for window installation based on the inputs received at 210, 212, 214, and/or 216. At 222, the estimator computing system 100 can prepare an estimate for door installation based on the inputs received at 210, 212, and/or 218. At 224, the estimator computing system 100 can present to the user the estimate for the window and door replacement.

FIGS. 3-12 depict simplified interfaces 330 that can be provided to a user computing device 328 by an estimator computing system 300 in accordance with one non-limiting embodiment. As provided above, the interfaces 330 can be presented in any suitable context or format, such as a website, a mobile application, a virtual reality display, and so forth.

Figure 3:
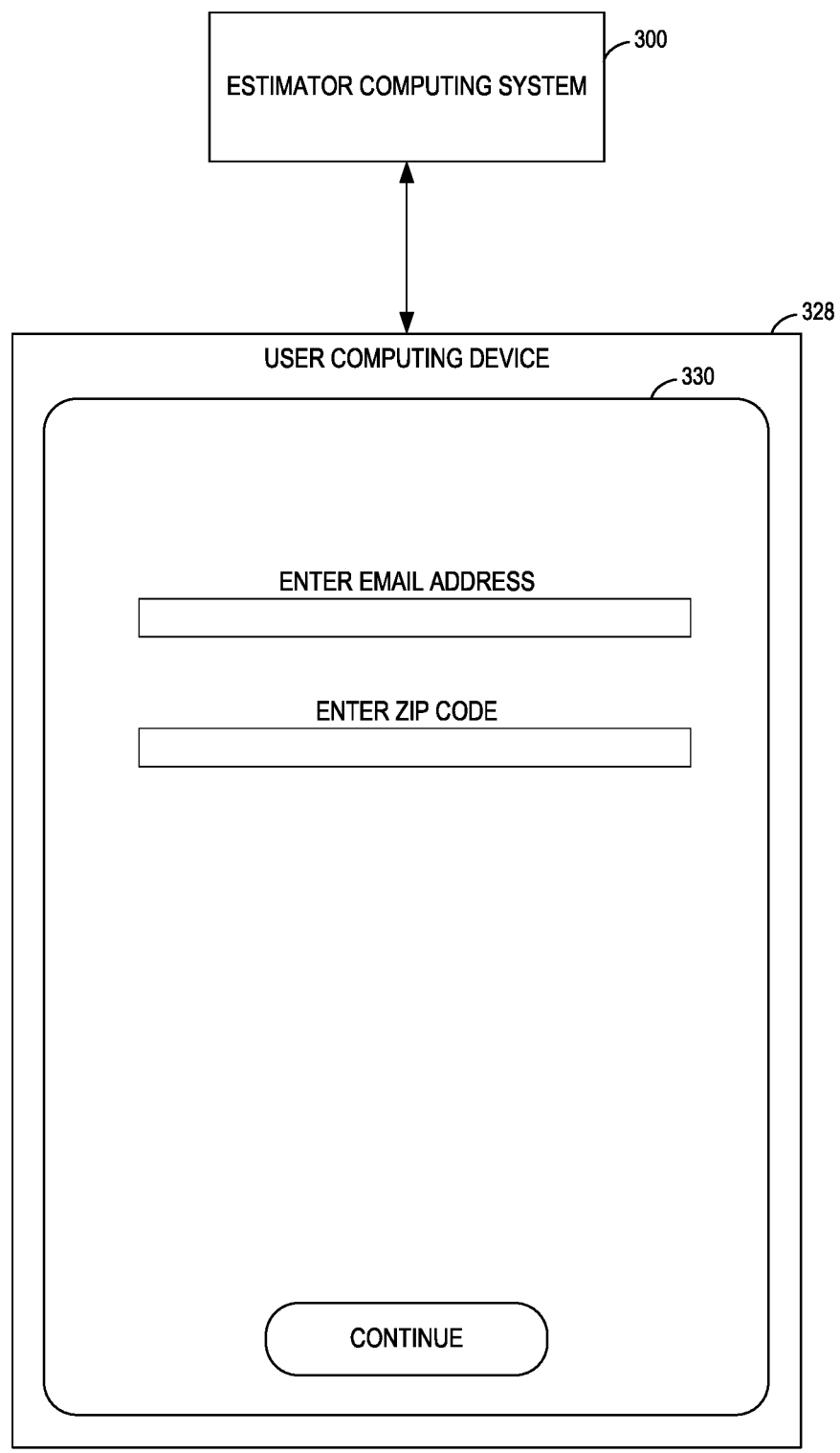
FIGS. 3-12 depict simplified interfaces that can be provided to a user computing device by an estimator computing system in accordance with one non-limiting embodiment.

Referring first to FIG. 3, a user can be prompted to enter various information to begin the estimation process. This information can allow the estimator computing system 300 to create a user record (i.e., based on their email address or other identifier) to track the user's interaction with the system. Based on the zip code, the estimator computing system 300 can determine the geographic location of the user.

Figure 4:
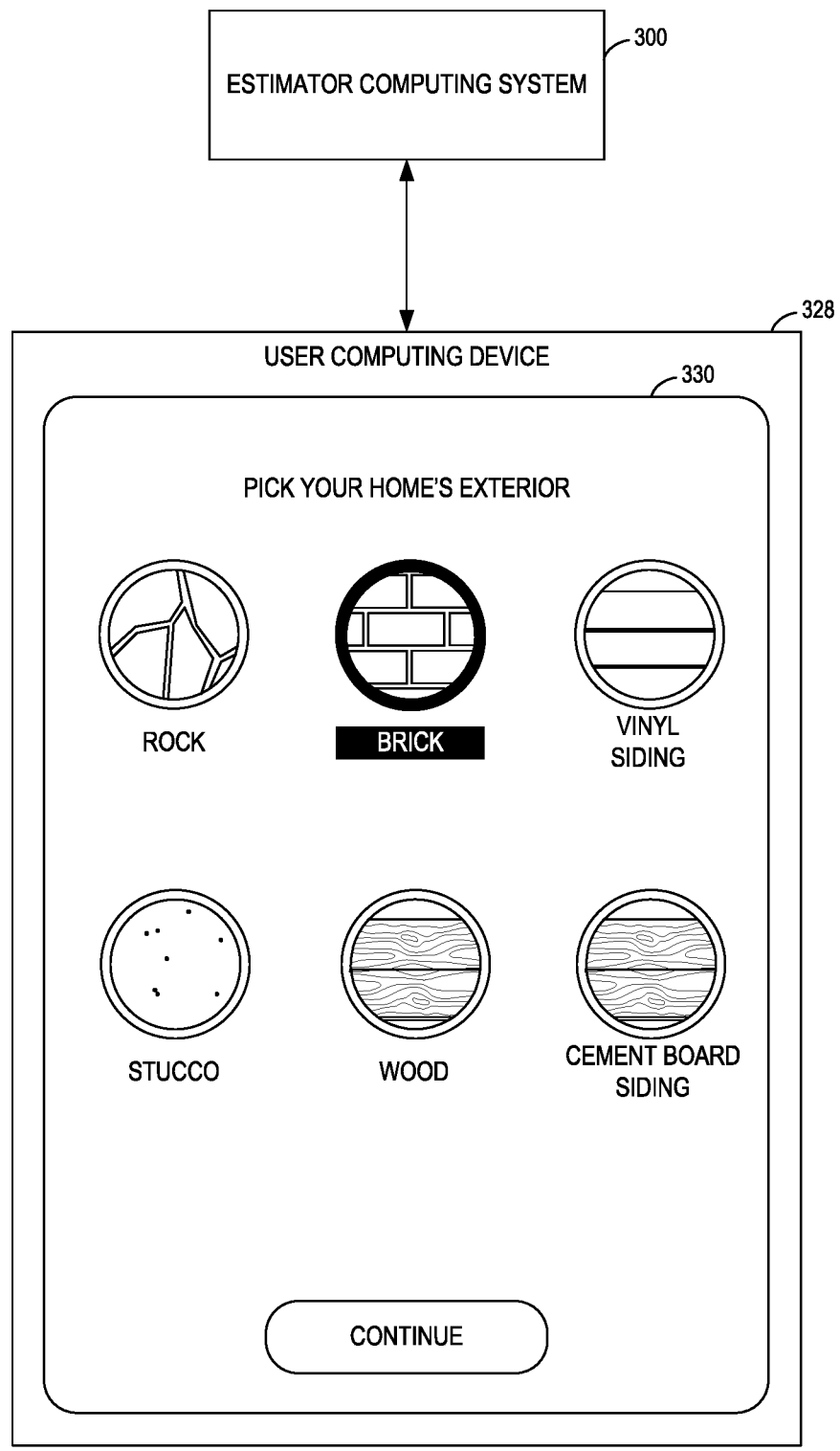

As shown in FIG. 4, the user can be prompted to identify the exterior of their home. In the illustrated example, exterior options include rock, brick, vinyl siding, stucco, wood, and cement board siding. As is to be appreciated, other types of exterior finishes can be included. As shown, the user has indicated that their home has a brick exterior.

Figure 5:
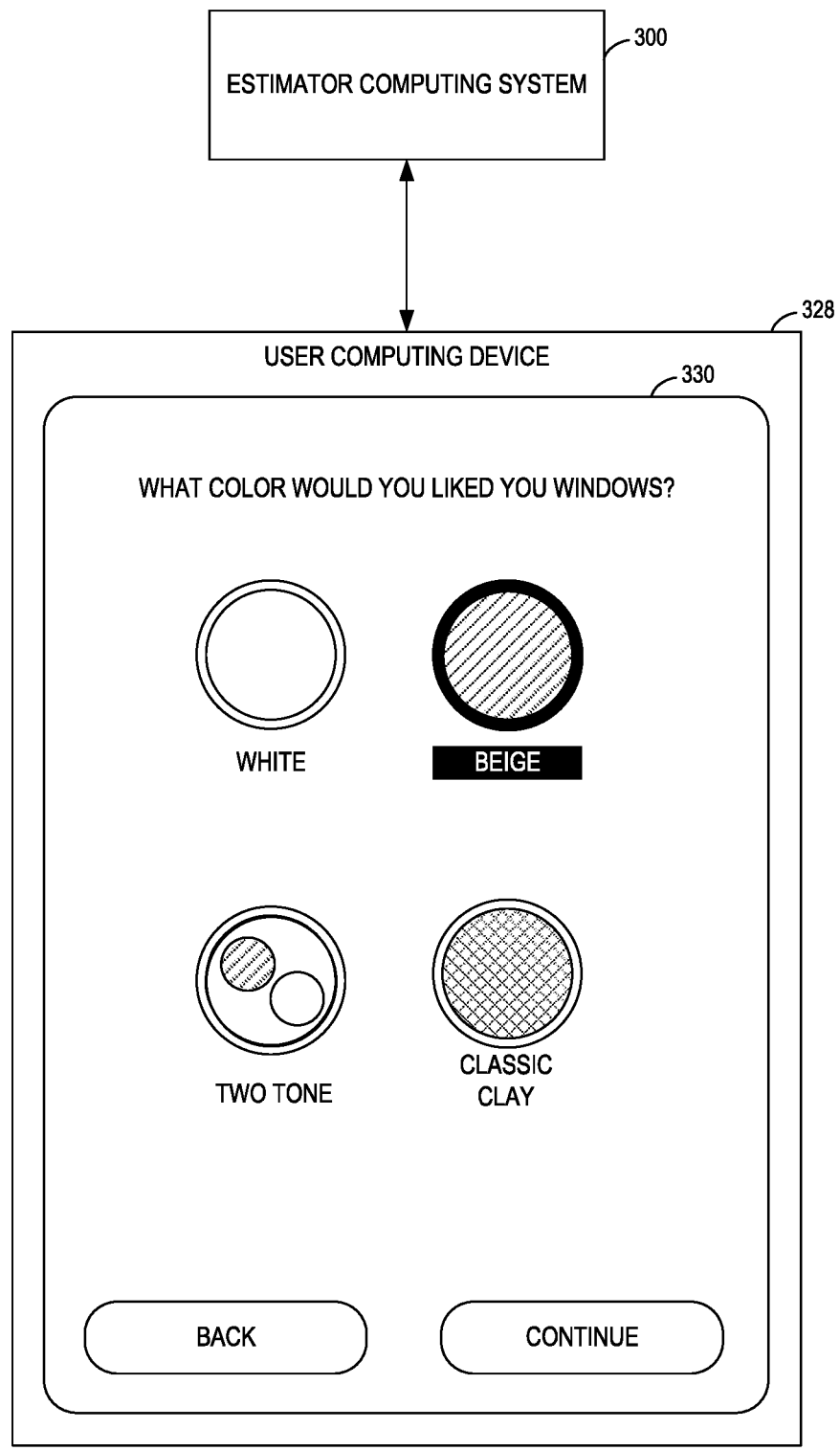

As shown in FIG. 5, the user can then be prompted to select a color for their windows. In the illustrated example, the color options include white, beige, two-tone, and classic clay. As is to be appreciated, other color offerings may be provided. As shown, the user has indicated that they want an estimate for beige replacement windows.

Figure 6:
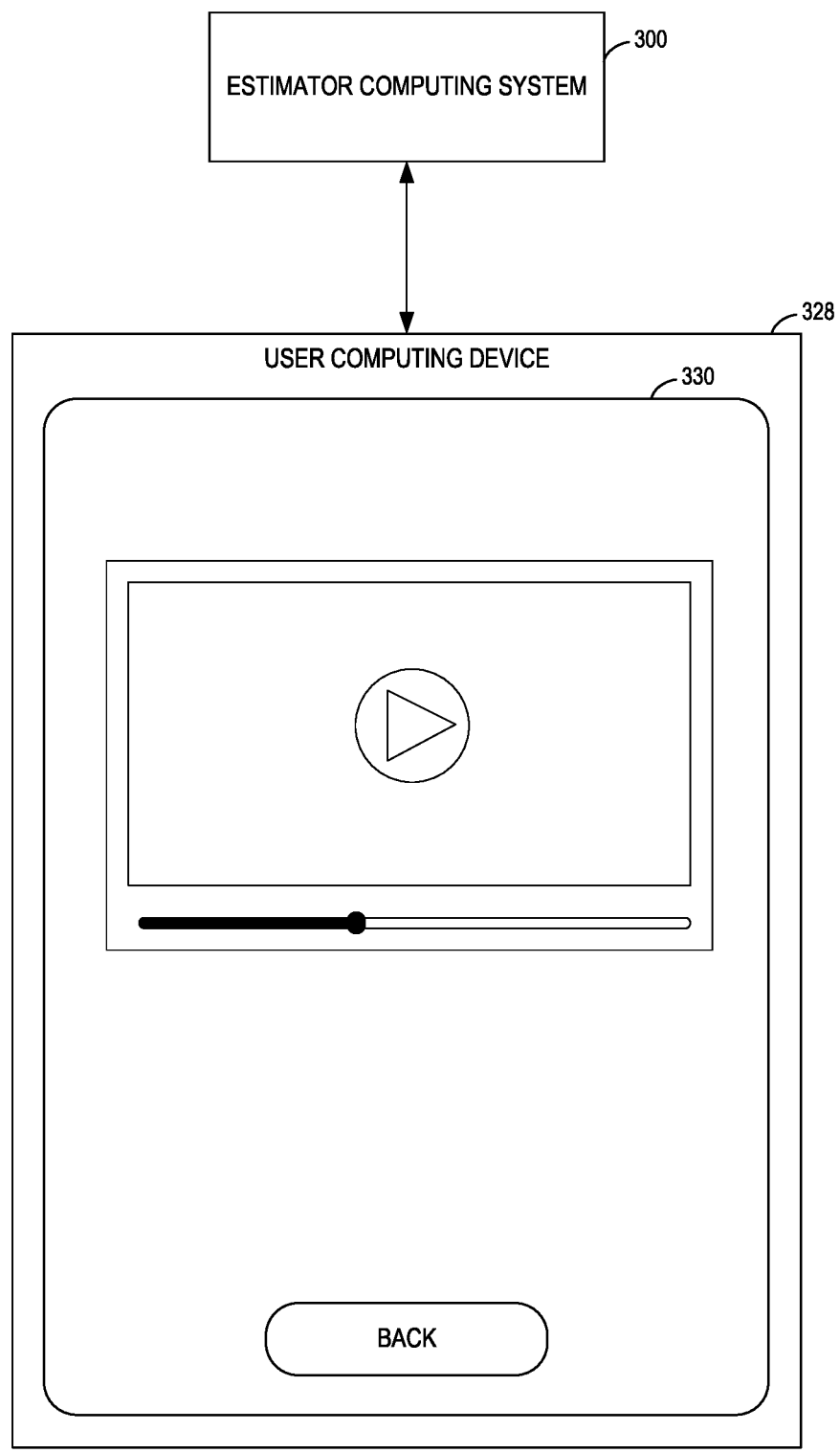

As shown in FIG. 6, in accordance with some embodiments, the user can then be required to watch an informational video before they can proceed to the next step.

Figure 7:
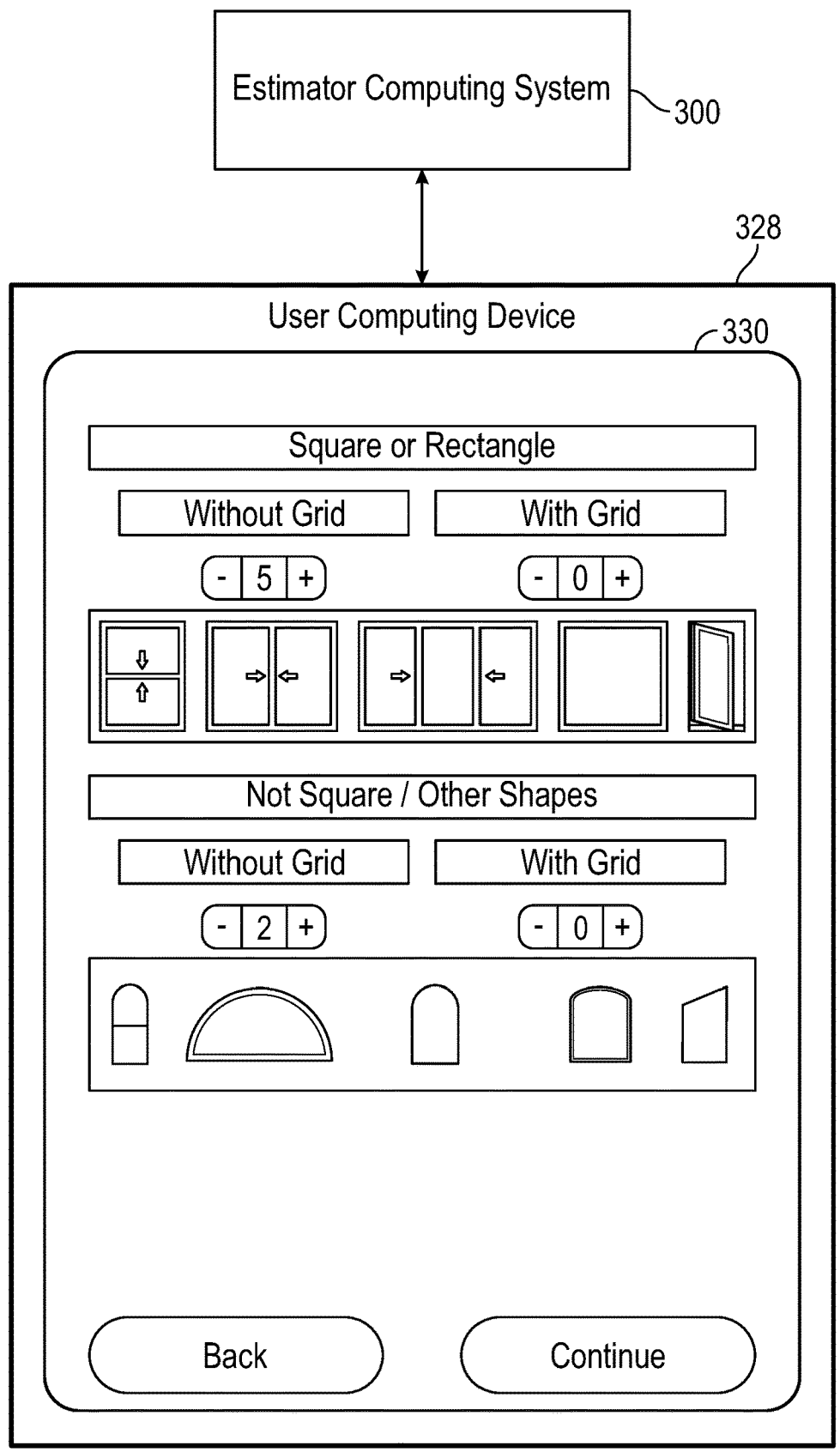

As shown in FIG. 7, the user can be provided with an interface to input the quantity of certain types of windows. In the non-limiting illustrated embodiment, the user is provided with the option to input the number of rectangular/square windows, both with and without grids. The user is also provided with the option to input the number of windows having other shapes, both with and without grids. As is to be appreciated, other categories of windows can be used. Nevertheless, as illustrated, the user is only required to enter a quantity and is not required to enter a measurement.

Figure 8:
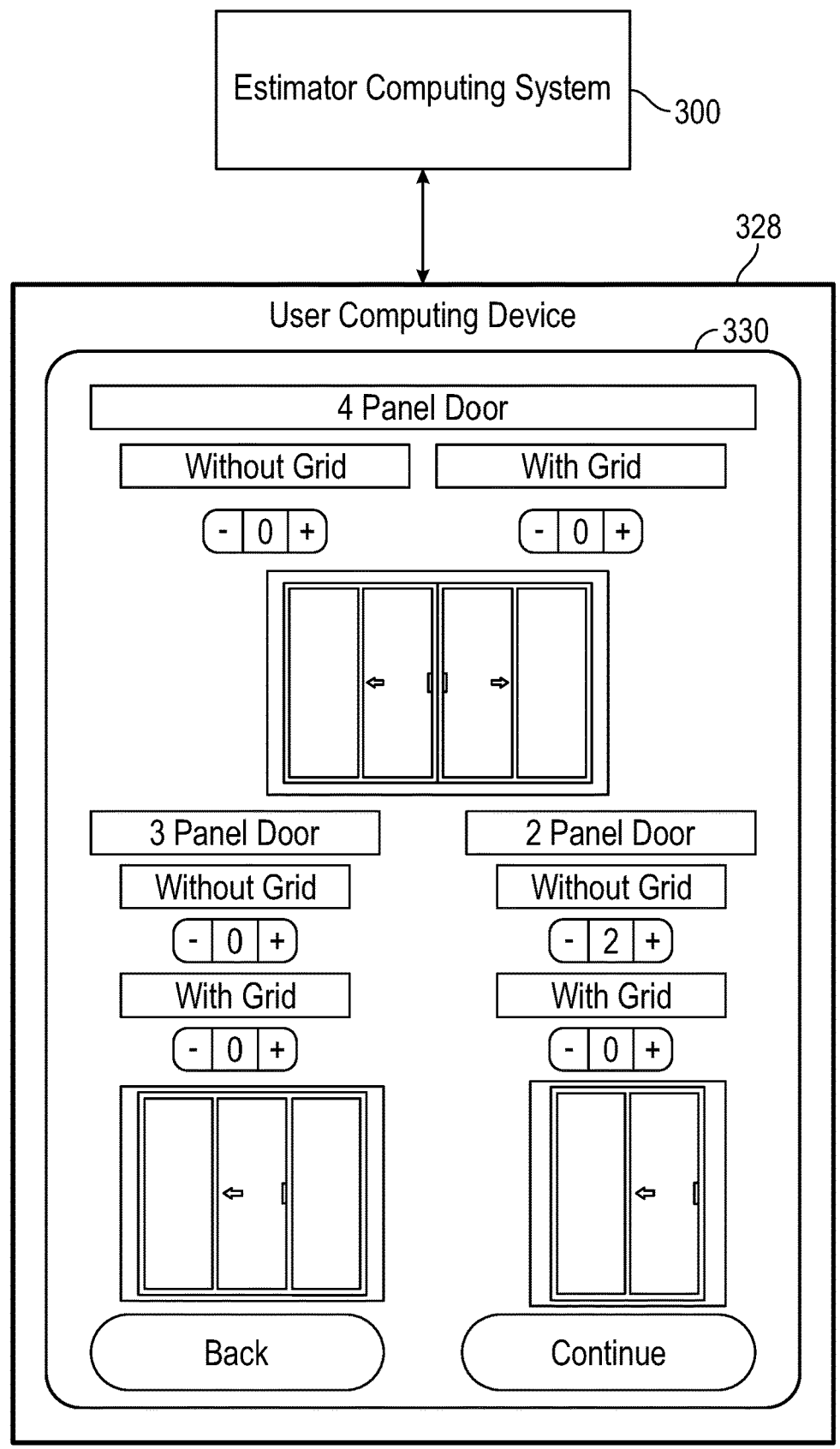

As shown in FIG. 8, the user can be provided with an interface to input the quantity of certain types of doors. In the non-limiting illustrated embodiment, the user is provided with the option to input the number of four panel doors, three panel doors, and two panel doors, each with and without grids. Again, as illustrated, the user is only required to enter a quantity and is not required to enter a measurement.

Figure 9:
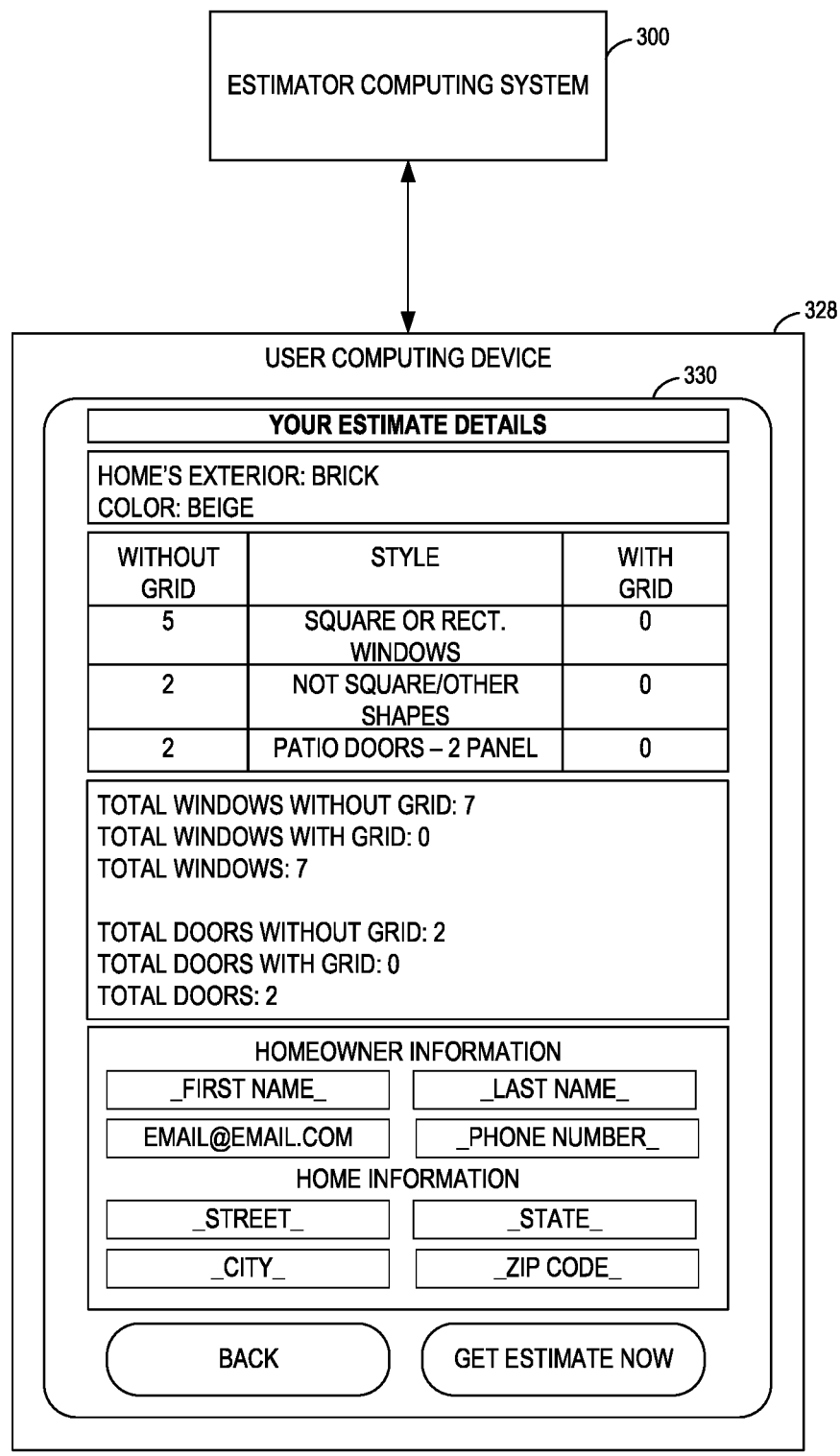
Figure 10:
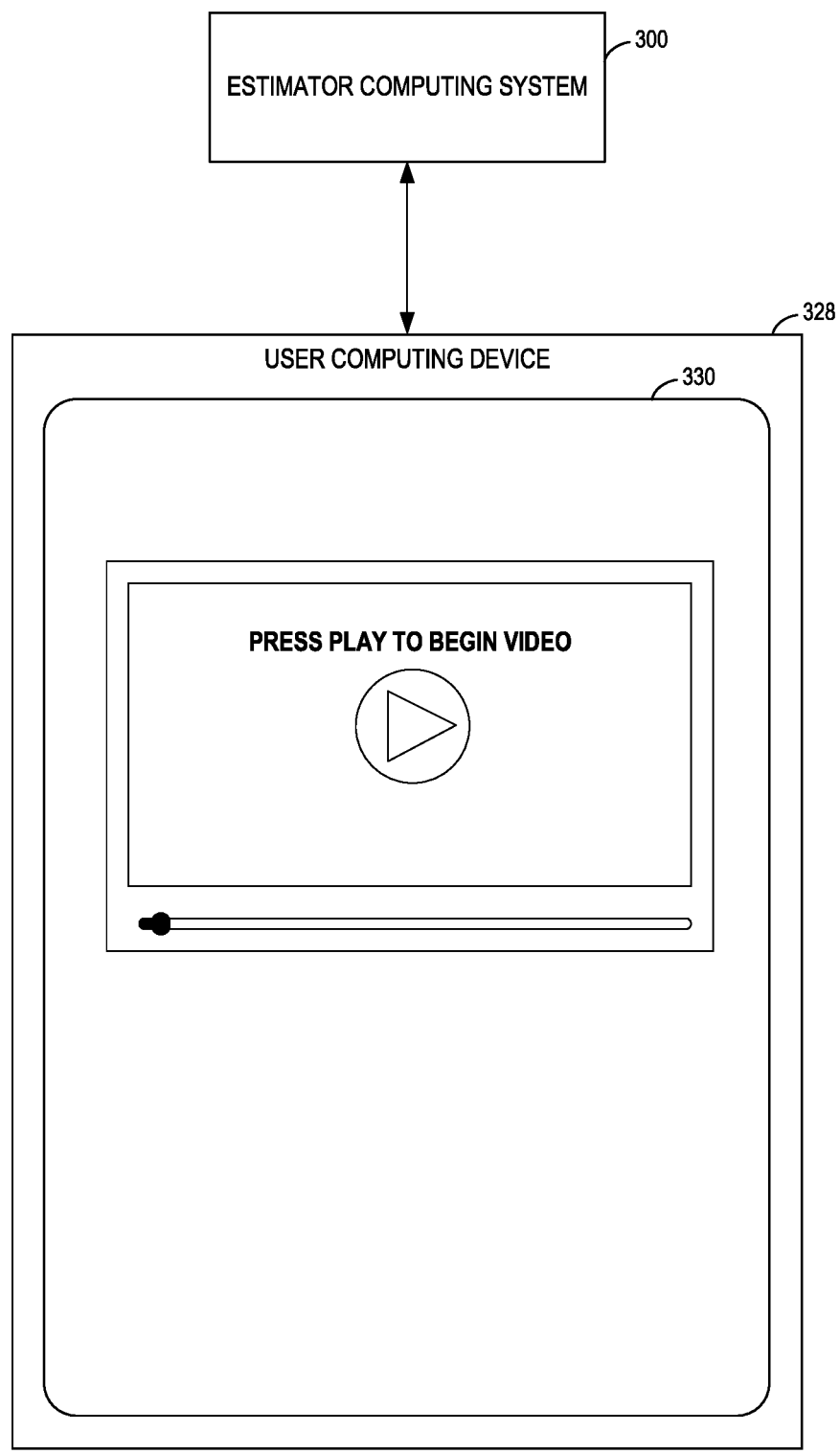

As shown in FIG. 9, the user can be provided with an overview of the estimate details, such as the total quantity of various types of windows and doors. The user can also be asked to provide addition information, such as phone number, home address, and so forth, which can then be added to the user record in the CRM computing system. Once all of the information is entered by the user, they can be presented with a "get estimate now" interactive element. As shown in FIG. 10, the user may be required to watch another video, which can contain marketing information.

Figure 11:
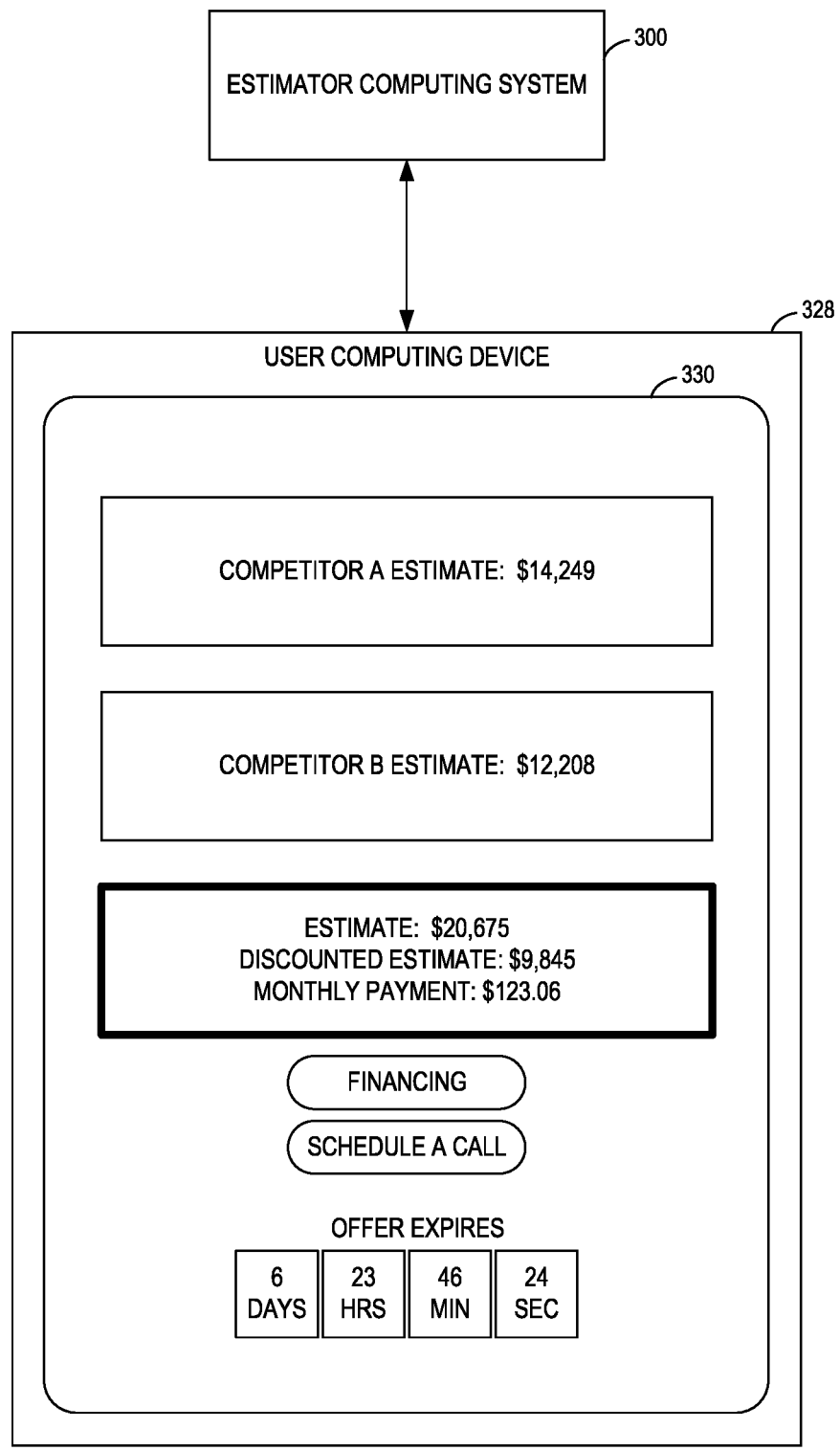
Figure 12:
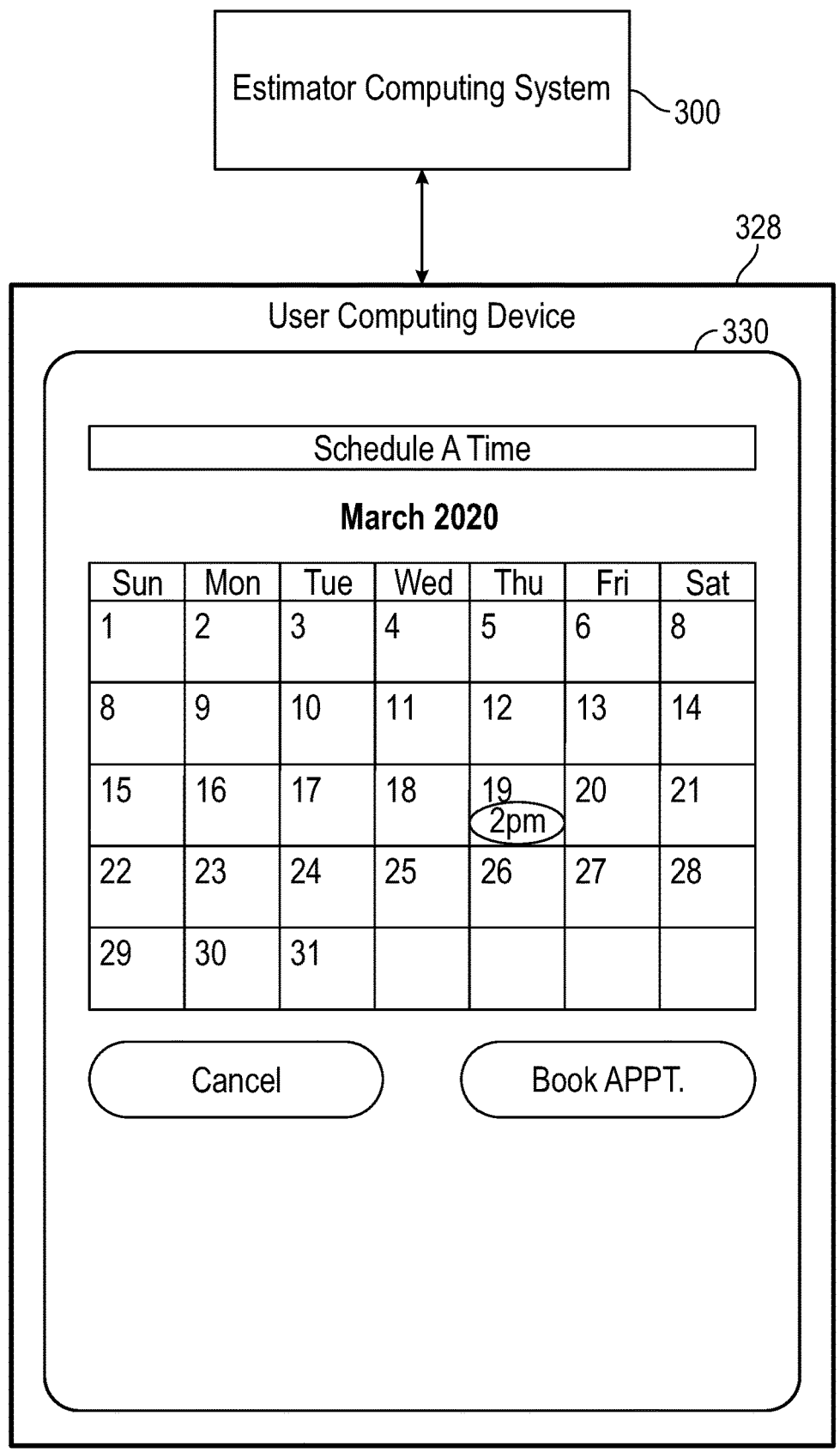

The user can then be presented with the estimate in any of a variety of suitable techniques. As shown in FIG. 11, the user is presented with sample estimates from two competitors (based on sample data) along with an estimate as computed by the estimator computing system. Additional options, such as finance options, can be provided to the user as well. In some embodiments, the estimate can be time sensitive with a countdown timer displayed on the interface to encourage the user to take action. Should the user wish to move forward, they can select the "schedule a call" feature and be provided with a calendar (FIG. 12) so that a follow-up call with a sales representative can be conveniently scheduled.

Figure 13A:
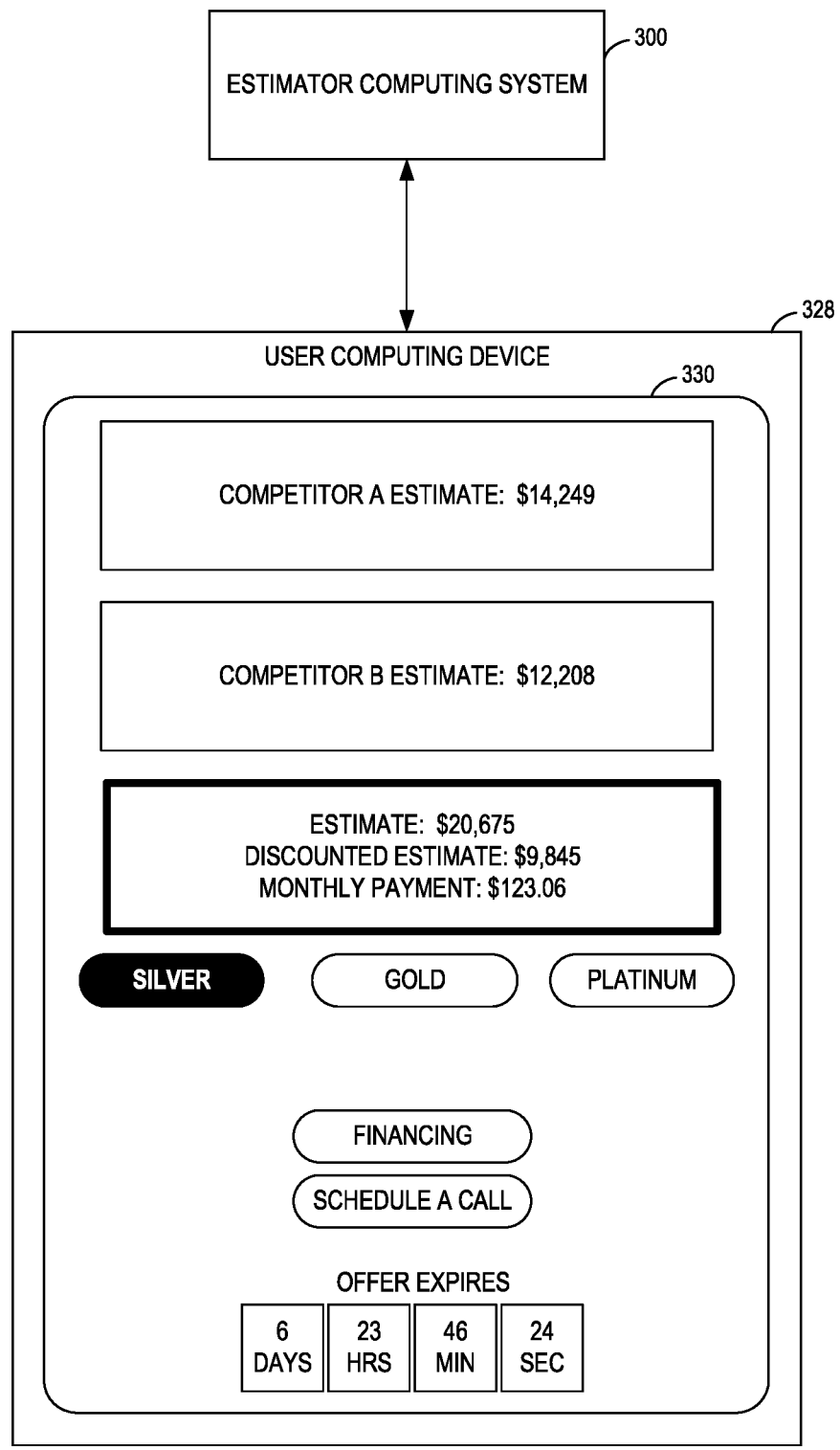
FIGS. 13A-13B provide example interfaces that allow the user to select a quality level of the windows/doors to be installed in their home.
Figure 13B:
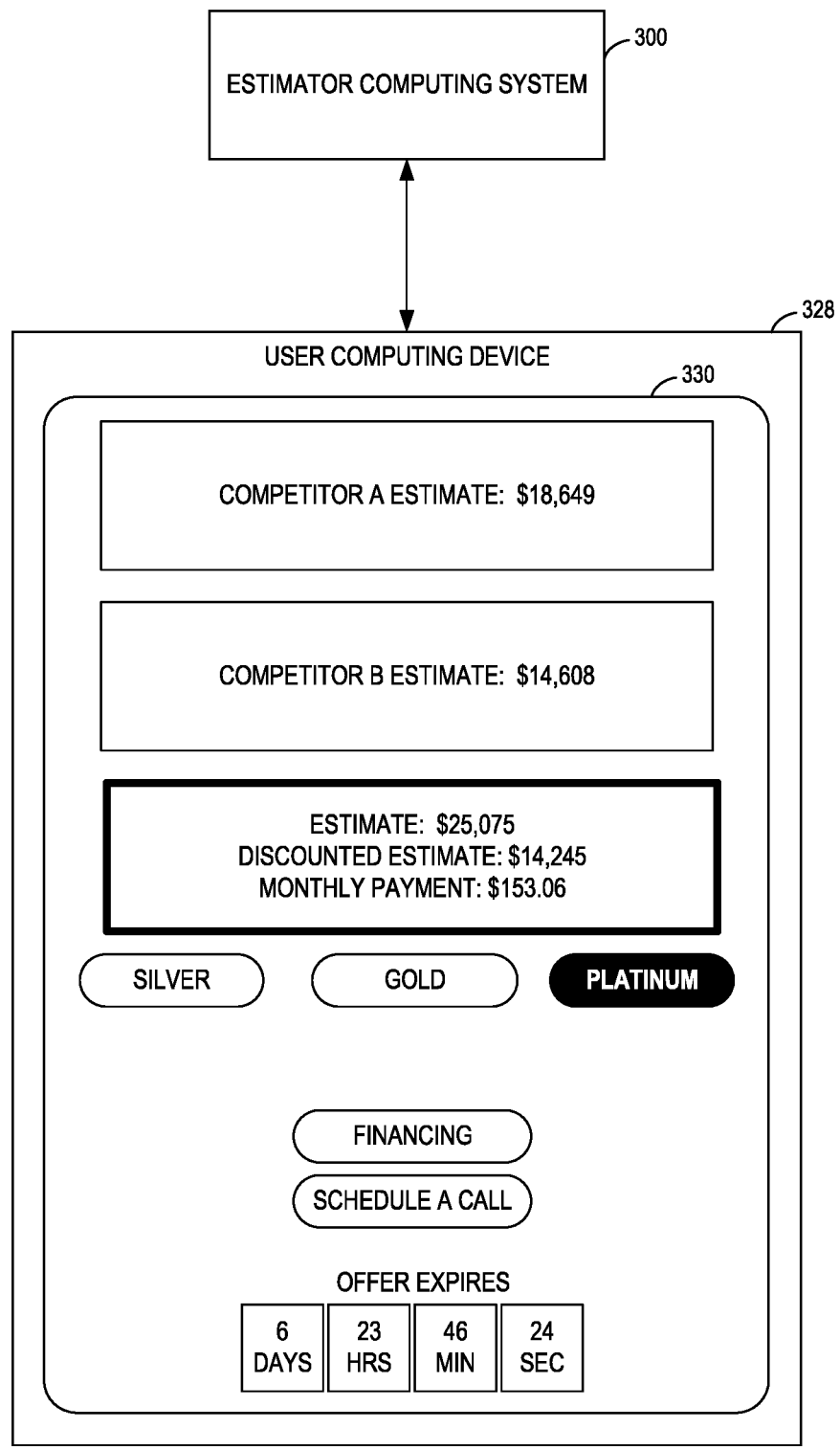

FIGS. 13A-13B provide example interfaces that allow the user to select a quality level of the windows/doors to be installed in their home. For instance, FIG. 13A shows the estimates for a "silver" quality of products and FIG. 13B shows the estimates for a "platinum" level of products. As such, the estimator computing system can provide the user with a variety of options so that they can select the level of quality and price point that works best with their budget.

Figure 14:
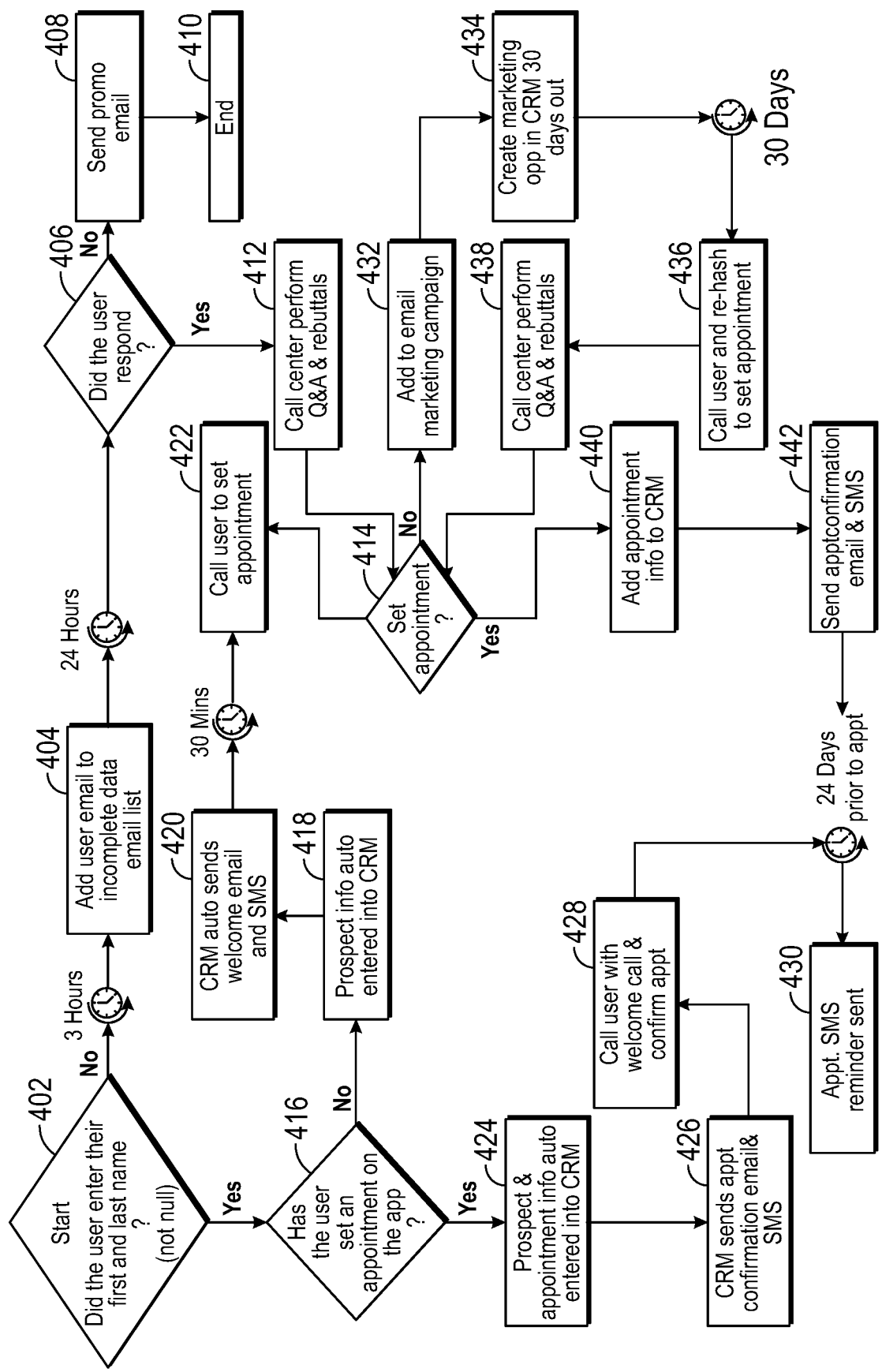
FIG. 14 depicts automated marketing processes that can be implemented by an estimator computing system in accordance with one non-limiting embodiment.

After receiving the estimate, the user may immediately move forward with commissioning the work. However, in other scenarios, the user may not immediately take action, or may not fully complete the process. In these scenarios, automated marketing processes can be implemented by the estimator computing system in an effort to convert the sale. An example process flow in accordance with one non-limiting embodiment is depicted in FIG. 14. At 402, it is determined if the user entered their first name and their last name into the interface. If they did not, after a period of time (such as 3 hours, for example), the user's email address is added to an "incomplete data" email list at 404 and an email requesting the information is sent to the user's email address. After a period of time, at 406 it is determined if the user responded. If the user did not respond, at 408 a follow-up promotional email is sent to that user. If it is determined at 406 that the user did respond, a call center representative can contact the user at 412 to follow-up with the user and determine if the user wishes to set up an appointment with a sales representative. At 414, it is determined if the user wishes to make an appointment and if so, at 440, the appointment can be added to the CRM computing system. At 442, an appointment confirmation can be sent to the user via email and/or SMS text. If the user does not wish to make an appointment, at 432, the user can be added to an email marketing campaign. Then, in order to ensure appropriate follow-up occurs, at 434, a "marketing opportunity" can be created in the CRM computing system in the future (i.e., 30 days out). Then, after the 30 days (or other suitable time period), at 436, the user can again be contacted in an attempt to schedule an appointment. At 438, the call center representative answers any questions the user may have and the process loops back to 414 to determine if the user wishes to make an appointment.

Referring again to 402, if it is determined that the user did enter their first and last name, at 416, it can then be determined if the user set up an appointment. If an appointment was not scheduled, at 418, the user information can be automatically entered into the CRM computing system as a prospect. At 420, the CRM computing system can automatically send a welcome email and/or welcome text message to the user. After a short period of time (i.e., 30 minutes, for example), at 422 a call center agent can attempt to reach the user via telephone. As the user had already received an email or text indicating that a follow-up call would be forthcoming, the chances of the user taking the call are increased. The process then proceeds to 414 to determine if the user wishes to make an appointment.

Referring again to 416, if it is determined that the user has set up an appointment, at 424, the user information and appointment can be automatically entered into the CRM computing system. At 426, an appointment confirmation is sent via email and/or SMS text to the user. At 428, a call center agent can call the user directly to orally confirm the appointment. Then, 24 hours prior to the appointment, an appointment reminder can be sent to the user 430 via text message, email, automated phone call, or other suitable means.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A computer-based method, comprising:
   storing, by an estimator computing system, pricing information for each of a plurality of window styles;
   presenting, by the estimator computing system, a graphical user interface on a user computing device, wherein the user is associated with a building, wherein the building has a first plurality of windows and a second plurality of windows, wherein the first plurality of windows have a first style and the second plurality of windows have a second style;
   receiving, by the estimator computing system, at least one building property via an input to the graphical user interface;
   requesting, by the estimator computing system, from the user a quantity of windows of the building having the first style;
   receiving, by the estimator computing system, a first numeric input via the graphical user interface, wherein the first numeric input is the quantity of windows of the building having the first style that are to be replaced;
   requesting, by the estimator computing system, from the user a quantity of windows of the building having the second style;
   receiving, by the estimator computing system, a second numeric input via the graphical user interface, wherein the second numeric input is the quantity of windows of the building having the second style that are to be replaced;
   based on the pricing information, the at least one building property, the first numeric input, and the second numeric input, determining, by the estimator computing system, an installation estimate to replace the first plurality of windows and the second plurality of windows; and
   displaying, by the estimator computing system, the installation estimate to the user via the graphical user interface.

2. The computer-based method of claim 1, wherein dimensional information is not requested by the estimator computing system.

3. The computer-based method of claim 1, wherein the first numeric input does not include dimensional information and the second numeric input does not include dimensional information.

4. The computer-based method of claim 1, wherein pricing information comprises average united inches (UI) data for each of the plurality of window styles.

5. The computer-based method of claim 1, wherein windows of the first style have a grid and windows of the second style do not have a grid.

6. The computer-based method of claim 1, wherein the user computing device is any of a tablet computer, mobile computing device, and a personal computer.

7. The computer-based method of claim 6, wherein the graphical user interface presented to the user over a communications network via a webpage.

8. The computer-based method of claim 6, wherein the graphical user interface presented to the user via a specialized application executing on the user computing device.

9. The computer-based method of claim 1, comprising:
   storing, by an estimator computing system, installer information for each of a plurality of installers; and
   displaying, by the estimator computing system, installer information for one or more of the plurality of installers on the graphical user interface.

10. The computer-based method of claim 9, wherein the at least one building property comprises an address of the building, wherein the installer information for each of a plurality of installers comprises a geographic area of service, and wherein the installer information displayed on the graphical user interface is based on the address of the building.

11. The computer-based method of claim 1, wherein the at least one building property comprises a building exterior type.

12. The computer-based method of claim 1, wherein the building has a first plurality of doors and a second plurality of doors, wherein the first plurality of doors have a first door style and the second plurality of doors have a second door style, the method comprising:
   storing, by an estimator computing system, pricing information for each of a plurality of door styles;
   requesting, by the estimator computing system, from the user a quantity of doors of the building having the first door style;
   receiving, by the estimator computing system, a third numeric input via the graphical user interface, wherein the third numeric input is the quantity of doors of the building having the first door style to be replaced;
   requesting, by the estimator computing system, from the user a quantity of doors of the building having the second door style;
   receiving, by the estimator computing system, a fourth numeric input via the graphical user interface, wherein the fourth numeric input is the quantity of doors of the building having the second door style to be replaced;
   based on the pricing information, the at least one building property, the third numeric input, and the fourth numeric input, determining, by the estimator computing system, a door installation estimate to replace the first plurality of doors and the second plurality of doors; and
   displaying, by the estimator computing system, the door installation estimate to the user via the graphical user interface.

13. The computer-based method of claim 1, further comprising:
   requesting, by the estimator computing system, from the user a quantity of windows of the building that are not rectangular;
   receiving, by the estimator computing system, a fifth numeric input via the graphical user interface, wherein the second numeric input is the quantity of windows of the building that are to be replaced that are not rectangular; and
   based on the pricing information, the at least one building property, the first numeric input, the second numeric input, and the fifth numeric input, determining, by the estimator computing system, an installation estimate to replace the first plurality of windows, the second plurality of windows; and the quantity of windows of the building that are not rectangular.

14. An estimator computing system comprising a data store, a processor and a non-transitory computer readable medium having instructions stored thereon which when executed by the processor cause the processor to:
   store pricing information for each of a plurality of window styles;
   present a graphical user interface on a user computing device, wherein the user is associated with a building, wherein the building has a first plurality of windows and a second plurality of windows, wherein the first plurality of windows have a first style and the second plurality of windows have a second style;
   receive at least one building property via an input to the graphical user interface;
   request from the user a quantity of windows of the building having the first style;
   receive a first numeric input via the graphical user interface, wherein the first numeric input is the quantity of windows of the building having the first style;
   request from the user a quantity of windows of the building having the second style;
   receive a second numeric input via the graphical user interface, wherein the second numeric input is the quantity of windows of the building having the second style;
   based on the pricing information, the at least one building property, the first numeric input, and the second numeric input, determine an installation estimate to replace the first plurality of windows and the second plurality of windows; and
   display the estimate to the user via the graphical user interface.

15. The estimator computing system of claim 14, wherein dimensional information is not requested by the estimator computing system.

16. The estimator computing system of claim 14, wherein the first numeric input does not include dimensional information and the second numeric input does not include dimensional information.

17. The computer-based method of claim 14, wherein the instructions which when executed by the processor further cause the processor to:
   store installer information for each of a plurality of installers; and
   display installer information for one or more of the plurality of installers on the graphical user interface.

18. A computer-based method, comprising:
   storing, by an estimator computing system, pricing information for each of a plurality of window styles;
   storing, by an estimator computing system, pricing information for each of a plurality of door styles;

presenting, by the estimator computing system, a graphical user interface on a user computing device, wherein the user is associated with a building, wherein the building has a first plurality of windows, a second plurality of windows, a first plurality of doors and a second plurality of doors, wherein the first plurality of windows have a first style, the second plurality of windows have a second style, the first plurality of doors have a first door style and the second plurality of doors have a second door style;

receiving, by the estimator computing system, at least one building property via an input to the graphical user interface;

requesting, by the estimator computing system, from the user a quantity of windows of the building having the first style;

receiving, by the estimator computing system, a first numeric input via the graphical user interface, wherein the first numeric input is the quantity of windows of the building having the first style to be replaced;

requesting, by the estimator computing system, from the user a quantity of windows of the building having the second style;

receiving, by the estimator computing system, a second numeric input via the graphical user interface, wherein the second numeric input is the quantity of windows of the building having the second style to be replaced;

requesting, by the estimator computing system, from the user a quantity of doors of the building having the first door style;

receiving, by the estimator computing system, a third numeric input via the graphical user interface, wherein the third numeric input is the quantity of doors of the building having the first door style to be replaced;

requesting, by the estimator computing system, from the user a quantity of doors of the building having the second door style;

receiving, by the estimator computing system, a fourth numeric input via the graphical user interface, wherein the fourth numeric input is the quantity of doors of the building having the second door style to be replaced;

based on the pricing information, the at least one building property, the first numeric input, the second numeric input, the third numeric input, and the fourth numeric input, determining, by the estimator computing system, an installation estimate to replace the first plurality of windows, the second plurality of windows, the first plurality of doors, and the second plurality of doors; and displaying, by the estimator computing system, the installation estimate to the user via the graphical user interface.

19. The computer-based method of claim 18, wherein dimensional information is not requested by the estimator computing system.

20. The computer-based method of claim 18, wherein the first numeric input does not include dimensional information, the second numeric input does not include dimensional information, the third numeric input does not include dimensional information, and the fourth numeric input does not include dimensional information.

\* \* \* \* \*